Figure 1:
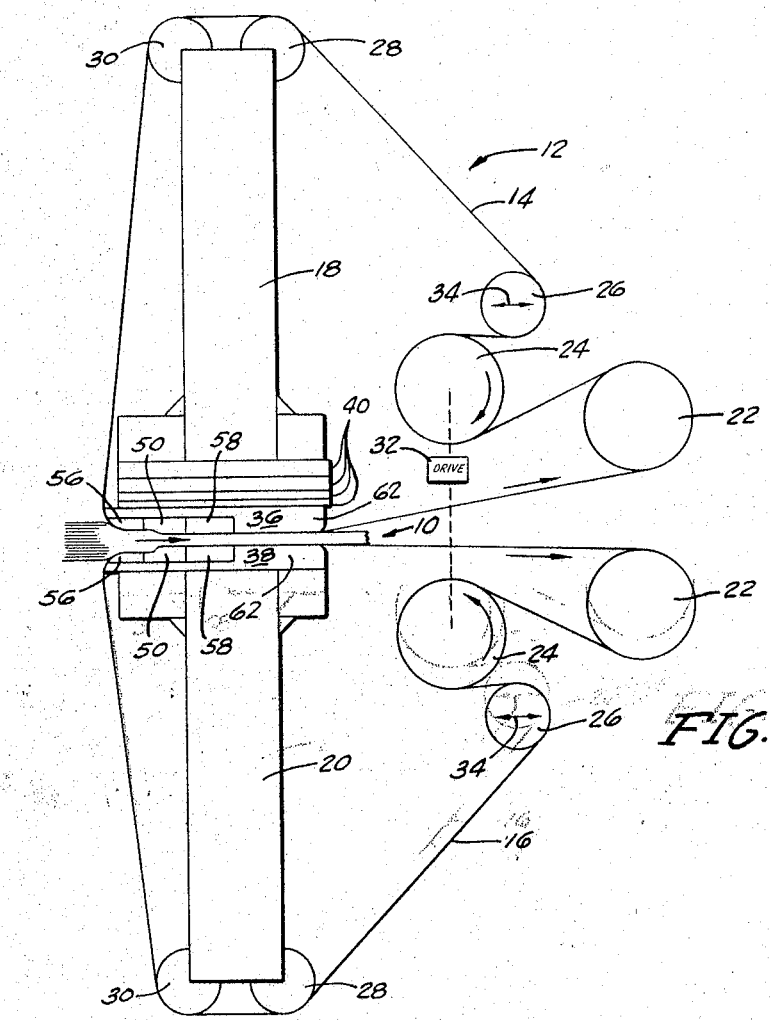

Jan. 17, 1967     C. H. VAN HARTESVELDT ETAL     3,298,887
METHOD OF MANUFACTURING LAMINATE SHEET
Filed July 23, 1964

INVENTORS
CARROLL H. VAN HARTESVELDT
BUDDY D. WAHL
BY
Olsen and Stephenson
ATTORNEYS United States Patent Office 3,298,887
Patented Jan. 17, 1967

3,298,887
METHOD OF MANUFACTURING LAMINATE SHEET
Carroll H. Van Hartesveldt, Toledo, Ohio, and Buddy D. Wahl, Ann Arbor, Mich., assignors to Hoover Ball and Bearing Company, Ann Arbor, Mich., a corporation of Michigan
Filed July 23, 1964, Ser. No. 384,580
5 Claims. (Cl. 156—311)

The present invention relates to a method of providing plastic laminates adapted primarily but not exclusively to be applied to surface of boards made from wood, plywood, pressed particles or the like. This method is adapted to be performed in apparatus of the type disclosed in copending application Serial No. 70,498, filed November 21, 1960, now United States Letters Patent No. 3,159,526.

It has been conventional practice heretofore to cover wood surfaces with sheets of high pressure laminates for protecting the wood and providing an attractive, smooth, moisture resistant and heat resistant surface. The plastic laminates are usually cemented to sheets of wood such as plywood or compressed particle boards or wood shavings boards. The plastic laminates are manufactured separately and usually include a large number of core sheets formed of phenolic resin impregnated core stock papers with melamine resin impregnated pattern paper on the core stock papers and a melamine resin clear overlay on the pattern paper.

The plastic laminates of the foregoing character have heretofore been manufactured in flat bed presses having a plurality of press openings and the laminates are compressed in multiple stacks in each press opening. A comparatively long time for completing the heating cycle in this type of apparatus makes it necessary to use resin systems that are comparatively slow to assure that each of the laminates in each multiple stack is elevated to the proper temperature. This type of operation is relatively time consuming and costly, and one of the features of the present invention is the method of operation whereby a plastic laminate can be produced continuously at a relatively rapid rate. This is accomplished by using novel apparatus of the type disclosed in copending application Serial No. 70,498, filed November 21, 1960.

It is an object of the present invention to provide an improved method for forming plastic laminates which is continuous in nature and in which the time for heating the plastic can be relatively fast so that resin systems that are comparatively rapid may be employed in the maunfacture of the laminates.

It is another object of the present invention to provide an improved method of forming plastic laminates whereby a finished product is obtained which is as good as or better than plastic laminates produced by previous methods.

It is another object of the present invention to provide a method of producing plastic laminates which has greater flexibility in use than previous methods so that manufacturers can more readily supply customers with custom made laminates having various ornamental appearances of the particular type desired by the customers.

It is another object of the present invention to provide an improved method for rapidly producing laminates with optimum finished plastic surfaces.

It is still another object of the present invention to provide an improved method of pressing and curing industrial laminates such as electrical and thermal insulation grades, printed electric circuits grades, and the like.

Other objects of this invention will appear in the following description and appended claims, reference being had to the accompanying drawing forming a part of this specification wherein like reference characters designate corresponding parts in the several views.

In the drawing:
FIGURE 1 is a side elevational view in schematic form of a machine adapted to be used to carry out the steps of the present invention; and
FIGURE 2 is a fragmentary enlarged side elevational view of the machine illustrated in FIGURE 1.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or teminology employed herein is for the purpose of description and not of limitation.

Figure 2:
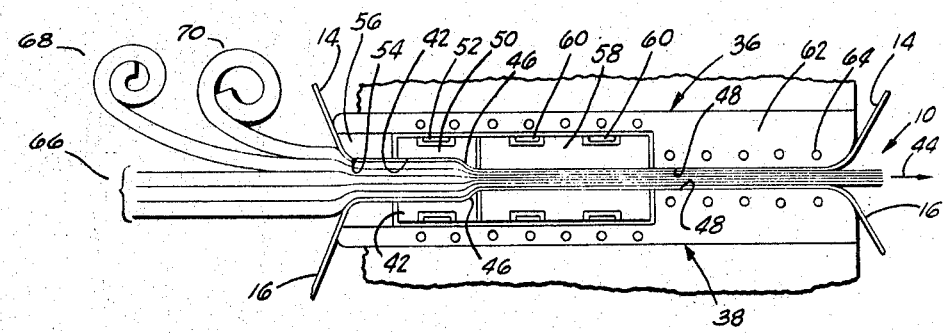

FIGURES 1 and 2 show a product 10 which results from carrying out the steps of the present invention. The drawing also illustrates schematically one embodiment of apparatus that may be used in carrying out this method, and attention is now directed to the drawing for a description of this apparatus.

The apparatus or continuous molding or pressing machine 12 has belts or shims 14 and 16 which are carried in upper and lower frames 18 and 20. The belts are supported on rollers and each of the frames and rollers are substantially identical in construction. The belts successively pass around rollers 22, 24, 26, 28 and 30. The rollers 24 are driven by a suitable drive 32 and the rollers 26 are shiftable to provide tension in the belts 14 and 16 as indicated by the arrowed lines 34. Shoes or platen assemblies 36 and 38 are supported on the frames 18 and 20 in spaced relationship, the spacing between the shoes 36 and 38 being controlled by selecting the desired size and number of removable blocks 40. Bearing surfaces or sheets, not shown but which are disclosed in copending application Serial No. 314,068, filed October 4, 1963, may be fitted over the exposed surfaces of platen assemblies 36 and 38 on which the belts 14 and 16 can freely slide.

The platen assemblies 36 and 38 are substantially identical in construction, and therefore only platen assembly 36 will be described, but the corresponding reference numbers will be applied to both of the platen assemblies 36 and 38. The platen assembly 36 is provided with a first surface 42 which is heated and which is parallel to the path of travel of the plastic laminate 10, as indicated by the directional arrow 44. As the workpiece 10 advances in the direction of the arrow 44 it next engages a sloping inclined compression surface 46. The platen assembly 36 then has a third surface 48 which is also parallel to the path of movement of the workpiece 10 and which continues to hold the workpiece 10 in a state of compression as it advances in its travel.

The first surface 42 is formed beneath preheat block 50 provided with a heating element 52. The preheat block, in one form of the method, is heated to 325° F., but the temperature can be regulated independently by apparatus not shown, but which is described in the aforesaid copending application Serial No. 70,498.

A lead-in surface 54 is provided before surface 42 for applying an adequate frictional force on the workpiece 10, and for this purpose extension 56 is mounted before the preheat blocks 50. The extension 56 has a surface which is coplanar with the lower surface of the preheat block 50 and has a round lead-in nose portion over which the belt 14 travels.

Directly after the compression surface 46 is located curing block 58 having heating elements 60. Preferably, the shape of the step 46 is formed by curved surfaces meeting each other with each curved surface forming the segment of an arc of a cylinder. The heating elements 60 can be controlled by means not shown, to heat the curing section to a temperature of approximately 420° F., and for a more detailed description of these features of the apparatus described, attention is again directed to copending application Serial No. 70,498.

Following the compression block 58 is the cooling block 62 which has a plurality of cooling coils 64 passing therethrough. Normally, the coolant is passed through the coils 64 at a rate so as to reduce the temperature of the cooling section to approximately 80° F.

As suggested, the apparatus 12, described above, is illustrated and described in greater detail in copending application Serial No. 70,498, filed November 21, 1960, and if a more detailed description of the apparatus and the operation of the same is desired, reference is made to this copending application.

FIGURE 2 shows one arrangement embodying the principles of the present invention for forming plastic laminates. As there shown, a plurality of phenolic resin saturated core stock papers 66 are fed from rollers, not shown, over which are first laid a melamine resin saturated pattern paper 68 and then a melamine resin saturated overlay paper 70. The cumulative thickness of the papers 66, 68 and 70 prior to their entry between the belts 14 and 16 is approximately 0.105 of an inch. This thickness results from using an overlay paper having a thickness of approximately 0.005 of an inch and a pattern layer paper also having a thickness of approximately 0.005 of an inch and eight core stock papers each having a thickness of approximately 0.010 to 0.012 of an inch. The inlet opening between the belts 14 and 16 measures 0.095 of an inch and the dimension of the space between the belts 14 and 16 in the areas of the heating blocks 58 and cooling blocks 62 is approximately 0.062 of an inch. In carrying out this operation, the preheat zone defined by the preheat blocks 52 was set to operate at a temperature of approximately 325° F. and the heating zone defined by the blocks 58 was set to operate at a temperature of approximately 420° F. Likewise, the cooling zone defined by the blocks 62 was set to operate at a temperature of about 80° F. In this operation the belts were moved at a rate of three feet per minute and the length of the platen assemblies 36 and 38 was approximately seventeen inches, comprising two inches at the preheat zone, one and one half inches at the step 46, six inches at the preheat or curing zone, and seven and one half inches at the cooling zone.

The resin impregnated papers used in the above-described operation were the following:

| Supplier | Code No. | Description | Resin type and percent content by weight | Percent volatile | Percent flow |
|---|---|---|---|---|---|
| Fabricon | PD 48-40-1 | Core | Phenolic 32-34% | | 2-4 |
| Fabricon | PD 48-56 | Pattern | Melamine 39-41% | 3.5-5.5 | |
| Fabricon | PD 48-48-1 | Overlay | Melamine 65-67% | | 8-14 |

These papers were prepared in a manner which is standard practice in the laminate industry and in a manner which is well described in technical literature. The papers were passed continuously through an aqueous solution of the desired resin with alcohol present where necessary to enhance solubility. Conditions were controlled to obtain the proper amount and distribution of the resins through the paper fibers.

After impregnation, the papers were dried continuously in a hot air oven to remove the solvents and to initiate polymerization. The degree to which this polymerization occurs is a factor in the subsequent molding into laminates. Control criteria are the volatiles left in the paper as a percentage of total weight and the amount of resin that will flow out of the papers when hot pressed in an impirical manner.

When papers processed as described above are used to make plastic laminates in the prior art flat bed presses, the laminates are pressed in multiple stacks in each press opening and a comparatively long time for complete heating makes it necessary to use resin systems that are comparatively slow. In the continuous method described above, the heating time and temperature prior to and after compression at the step 46 is precisely the same for the approximately 10 sheets of paper that are continuously fed through the machine. This has allowed the use of faster curing resin systems than those in the papers listed above. By the use of these accelerated resins (both melamine and phenolic) the speed of through-put has been increased from three to twelve feed per minute and even faster rates are expected as resin systems are improved and tailored to fit the continuous process described.

Another contribution to high through-put speeds has been the capability developed to run at higher temperatures by improving the bearing sheets that are used in the machine described in connection with the present invention, and for a description of such bearing sheets, attention is directed to copending application Serial No. 314,068, filed October 4, 1963. It has been found that the improved bearing sheets are capable of withstanding temperatures of 500° F., and when such improved bearing sheets are used and platen assemblies, having higher heating capacities, are employed, it has been found that excellent plastic laminates have been produced by using a temperature of 350° F. in the preheat zone defined by the blocks 50, and a temperature of 475° F. in the heating zone defined by the blocks 58, and in running the belts at a rate of 12 feet per minute. This continuous operation was carried out in platen assemblies having an effective length from the inlet to the discharge end of approximately seventeen inches of which approximately two inches are in the preheat section, one and one half inches are in the compression step 46, six inches are in the heating or curing section, and seven and one half inches are in the cooling section.

It has also been found particularly advantageous to compress the resin saturated papers and a predetermined amount at the inlet end of the continuous molding machine and another predetermined amount at the step 46. It has been found that exceptionally good results in manufacturing plastic laminate sheets have been realized when the reduction in thickness of the resin saturated papers that occurs at the inlet end is substantially the same as that which occurs at the step 46. Thus, it has been found that if the cumulative thickness of the resin impregnated papers 66, 68 and 70 is 0.04 of an inch thicker than the thickness of the plastic laminate that issues from the machine 12, it is desirable that 0.02 of an inch of this compression occur at the inlet end of the machine 12 and the remaining 0.02 of an inch of compression occur at the step 46. When using this amount of precompression at the extension 56 and the same amount of compression at the step 46, it has been found that a plastic laminate having excellent appearance and smoothness of surface is obtained.

The continuous process used for making laminates requires sufficient pinch (interference between papers entering and the preheat zone opening) and temperature to heat the resins in the paper to a molten or, at least, a highly plastic state. If this is not done excessive forces are generated at the step 46. On the other hand, if too much heat and pressure are applied in the preheat zone, the papers will lose their compressibility and the resins will not flow because they will be polymerized past the point where they can do so, consequently it can be seen that for a given reactivity of resins in the papers processed, there are conditions of speed, temperatures and step sizes that are optimum for a given thickness of product.

An important feature of the continuous process comprising the present invention is that the present process can be interrupted and a different pattern paper can be substituted so that plastic laminates of different appearances and in small quantities can be made to order to the extent desired for various customers. Thus, a small manufacturer can supply the needs of his customers readily without keeping on hand large inventories of finished plastic laminates.

In addition to decorative laminates, the continuous process comprising the present invention has been proved effective in the pressing and curing of many industrial laminates. Among these are:

(1) Electrical and thermal insulation grades from phenolic impregnated core stock (kraft).
(2) Printed circuit grades with top layer of copper foil and the subsurface made with epoxy impregnated glass cloth of phenolic impregnated core stock (kraft).

Having thus described our invention, we claim:

1. The method of molding a plastic laminate comprising positioning a plurality of layers of thermosetting plastic in overlaying relationship, heating the plastic to a viscous state, applying a progressing local pressure to the surface of the plastic, and while continuously maintaining pressure on the plastic heating the plastic to a temperature for a time sufficient to cure the plastic and immediately thereafter cooling the plastic.

2. A method of continuous molding of a plastic laminate comprising continuously superimposing one upon another a plurality of layers of thermosetting plastic, continuously advancing said superimposed layers and heating the plastic to a viscous state, applying a progressing local pressure to the surface of the advancing plastic, and while continuously maintaining pressure on the advancing plastic heating the plastic to a temperature for a time sufficient to cure the plastic and immediately thereafter cooling the advancing plastic.

3. The method of forming a plastic laminate in an assembly having spaced inwardy stepped compression surfaces and a pair of endless flexible belts moving in spaced relation to each other continuously across said compression surfaces, comprising feeding a sufficient number of layers of thermosetting plastic between said moving belts to place the layers in a state of compression therebetween, preheating the compressed layers at a rate to assure that the plastic is in a viscous state when it reaches the inward stepped portions of the compression surfaces, heating the plastic after it passes the inward stepped portions to a temperature for a time sufficient to cure the plastic and immediately thereafter while the plastic is still traveling between said compression surfaces cooling the plastic.

4. The method of continuously molding plastic laminate to a predetermined thickness from a plurality of layers of thermosetting plastic, comprising positioning in superimposed relationship a plurality of layers of thermosetting plastic having a cumulative thickness in excess of the predetermined thickness of said laminate, moving said layers through a precompression zone wherein said layers are progressively compressed to a thickness less than said cumulative thickness, preheating the plastic to a viscous state while in said precompression zone, moving the viscous plastic into a compression zone so as to progressively apply pressure to the viscouse plastic to compress the plastic to said predetermined thickness, and heating the plastic after compression to a curing temperature of the plastic while continuously maintaining pressure on the plastic.

5. A method of molding a plastic laminate having a printed electrical circuit comprising superimposing one upon another a plurality of layers of thermosetting plastic, placing a layer of electrically conductive foil on said layers of thermosetting plastic, advancing said layers of plastic and foil and preheating the plastic to a viscous state, applying a progressing local pressure to the surface of the advancing layers to compress the same and embed the foil in the plastic, and while continuously maintaining pressure on the advancing layers heating the plastic to a temperature for a time sufficient to cure the plastic and immediately thereafter cooling the advancing plastic and embedded foil.

References Cited by the Examiner

UNITED STATES PATENTS

| | | | |
|---|---|---|---|
| 1,361,970 | 12/1920 | Dickey | 156—311 |
| 2,136,730 | 11/1938 | Sweetland | 156—580 |
| 2,154,474 | 4/1939 | Scott | 156—516 |
| 2,433,965 | 1/1948 | Upson | 156—280 |
| 2,801,198 | 7/1957 | Morris et al. | 161—246 |

EARL M. BERGERT, *Primary Examiner.*

H. F. EPSTEIN, *Assistant Examiner.*